Figure 1:
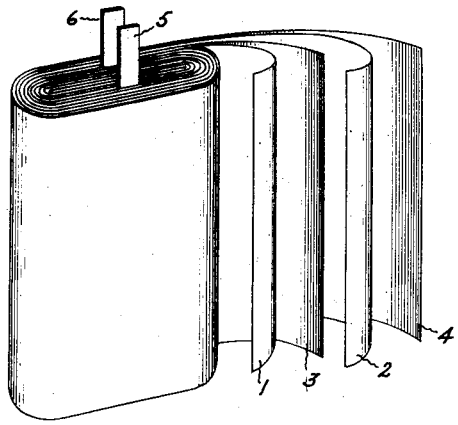

May 17, 1938.  F. M. CLARK  2,117,874
ELECTRIC CAPACITOR
Filed Jan. 27, 1934

Inventor:
Frank M Clark,
by Harry E. Dunham
His Attorney.

Patented May 17, 1938

2,117,874

UNITED STATES PATENT OFFICE 2,117,874

ELECTRIC CAPACITOR

Frank M. Clark, Pittsfield, Mass., assignor to General Electric Company, a corporation of New York Application January 27, 1934, Serial No. 708,621

6 Claims. (Cl. 175—315)

The present invention relates to electric capacitors and is more particularly concerned with improved capacitors employing armatures or electrodes consisting of unoxidized material which, however, is capable of forming dielectric films thereon, these armatures being separated by a thin dense, relatively non-absorbent dielectric septum, and containing a non-aqueous liquid having dissolved therein an ionogen.

One of the principal objects of my invention is to provide capacitors which do not require filming of the electrodes before use. It is another object of my invention to provide a stable capacitor of high efficiency which will not deteriorate during periods of idleness.

It has been proposed, heretofore, to employ as an electrolyte in a capacitor or rectifier a solution of a suitable salt in a water-free polyhydric alcohol. Porous absorbent material has also been used as a supporting means for the electrolyte in capacitors. Such material does not constitute a dielectric septum but functions rather as a support for the electrolyte. The electrodes employed in this type of capacitor are generally made of aluminum and are known as the "film type" electrodes. By "film" is meant a dielectric layer consisting of oxide or hydroxide, which is formed on certain metals when subjected to a chemical process or to electrolysis in an aqueous solution. Such films may be prepared on the armatures prior to or after assembly of the apparatus by a special treatment which adds to the cost of manufacturing such articles. Furthermore, the employment of such "filmed" electrodes makes it necessary to put the capacitors containing them into service promptly and to maintain them in service without long interruptions as the film deteriorates when the device is not used.

I have discovered that a non-aqueous alcoholic solution of Rochelle salt can be used with marked advantages in connection with unoxidized, potentially film-forming electrodes or armatures, such as aluminum or tantalum electrodes, and in combination with a substantially non-porous diaphragm of dielectric material such as paper, cellulose esters (such as the acetate), cellulose ethers (such as the methyl or ethyl ether), sheet mica, or varnished silk, or other septum of dielectric material which is chemically inert with respect to such solution. Such substantially non-porous, dense sheet dielectric is not used merely as a spacer for the absorption of impregnant, but serves itself in a dielectric capacity.

While the armatures or electrodes may become filmed during use, the operativeness of the capacitor does not depend on the presence of such films. During periods of non-use the electrode films may deteriorate but the presence of the dielectric septum allows the capacitor to be put into immediate use, dispensing with the special refilming of the electrodes.

The use of previously chemically oxidized aluminum foil in my capacitor would decrease the capacity and increase the power factor value approximately 4½ times as compared to the use of non-oxidized aluminum foil.

The use of a porous absorbent material, such as cotton cheesecloth, linen cloth or the like in capacitors in place of the dense sheet membrane of non-conducting material also causes an increase of power factor or energy loss. For example, the introduction of cheesecloth in capacitors embodying my invention raises the power factor from 8 to 18 per cent.

Capacitors embodying my invention have extraordinary high capacities for a given armature (electrode) surface. They have extremely small bulk, being assembled in a compressed state with the armatures separated only by the thickness of the paper or other dielectric septum. As already indicated, no "forming" of the electrodes is required and substantially no deterioration results in periods of idleness.

While I employ a solution of a salt in my capacitor it does not have all the properties ordinarily characteristic of an electrolytic capacitor. The introduction of a dielectric septum causes the capacity to drop as the thickness of the dielectric material increases.

Figure 2:
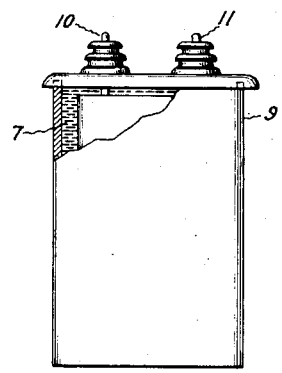

In the accompanying drawing Fig. 1 shows in side elevation a partly unrolled capacitor assembly which is provided with a paper dielectric member and Fig. 2 shows in side elevation a complete capacitor in its case which contains a liquid composition made in accordance with my invention.

The electrodes of the capacitor shown in Fig. 1 consists of sheets 1, 2 of unoxidized aluminum, tantalum, or other suitable potentially oxidizable metal. Adjacent the sheets 1 and 2 are sheets 3, 4 of substantially non-porous dielectric material. When the sheets thus assembled are wound up the sheets of dielectric 3 and 4 are interposed between successive layers of metal foil 1 and 2. Instead of a single sheet of paper it is preferable in some cases to employ two or even three sheets, but in the drawing a single sheet has been shown to avoid complicating the drawing. I prefer to employ kraft paper such as described in United States Letters Patent 1,850,702 issued March 22, 1932, to Amos Allen. Such paper has a density at least as high as about 0.95. The other materials mentioned above as suitable for use in place of paper have still higher density. Contact to the metal foil which constitutes the armatures of the capacitor is made by strip conductors 5, 6.

The capacitor assembly is subjected to the heated liquid impregnating material for at least about one-half hour at a temperature of 110° C. or even higher. As already indicated above, Rochelle salt is dissolved in alcohol for the preparation of the treating solution. As the alcohol I prefer to employ ethylene glycol, although glycerine, or other polyhydric alcohol in which the ionogen is soluble to the desired amount may be employed. The alcohol is distilled in a vacuum under conditions suitable for removing water vapor and other impurities. Rochelle salt which, as well known, is a tartrate of sodium and potassium, preferably should be dissolved in the crystalline state, that is, without removing the water of crystallization. The alcohol should be employed as a saturated or nearly saturated solution. About 5 to 10 per cent by weight of the Rochelle salt is present in a saturated solution of this salt in ethylene glycol. Ordinarily about one to ten per cent of the Rochelle salt ionogen should be present in the solution.

After treatment in this solution the capacitor assemblies are hermetically sealed into containers with suitable sealing compounds, such for example as Montan wax, asphalts, or resinous compositions. In Fig. 2 is shown a distinct body of treating liquid 7 surrounding the capacitor assembly but it should be understood that the assembly may substantially fill the casing 9, the liquid merely wetting and adhering to the capacitor surfaces. The conductors 5, 6 are connected to the external contacts 10, 11.

The high capacity of a capacitor embodying my present invention may be made evident by a comparison of the same with a capacitor made up similarly of kraft paper treated with wax or mineral oil. In the case of a capacitor made up in accordance with my invention approximately .001 square foot of active armature or foil surface will have a capacity of one microfarad. On the other hand, a wax or oil treated capacitor having the same construction requires a foil or armature surface of about 8 to 10 active square feet for the same capacity of one microfarad. A capacitor, such as shown in the drawing, employing as armatures $\frac{1}{10}$ mil. aluminum foil having a length of 1¾ feet and a width of 3½ inches separated by two or three sheets of $\frac{1}{10}$ mil. kraft paper and treated as above described has a capacity of 700 to 800 microfarads. The power factor of a capacitor made in accordance with my invention varies with the voltage. At 1 to 4 volts per unit the power factor is about 10 per cent. At higher voltages the power factor increases, rising to 15 per cent at 6 volts and 18 per cent at 20 volts.

As the power factor is a measure of energy loss it is desirable to employ an arrangement which will keep down the power factor to a minimum and therefore I prefer to connect sufficient units of capacity in series to keep the voltage applied to each unit within the limits of commercially suitable power factor values. For example, when it is desired to connect a capacitor made in accordance with the present invention to apparatus operating at 110 volts, I prefer to connect 15 units in series, each unit therefore operating at approximately 8 volts and giving a power factor of about 15 per cent. While with such a series connection the high efficiency of capacity will be reduced it is still high as compared with wax or oil treated capacitors, for example with a capacity of about 50 microfarads approximately 25 square feet of active foil surface are required when operating with a series connection of 15 units. In a wax treated capacitor which will operate directly on 110 volts as a single unit about 400 square feet of active foil surface are required for a capacity of 50 microfarads.

Capacitors embodying my invention are especially well suited for intermittent duty at high voltages, that is, voltages of 110 volts or higher or for continuous duty at low voltages.

Capacitors employing kraft paper and an impregnating liquid consisting of ethylene glycol and Rochelle salts when connected in units, 8 in series and tested at 110 volts intermittently showed great stability. After 100,000 repetitions of voltage the capacitors have been found substantially intact, the power factor showing only a slight rise.

I do not wish to be understood as limited to the exact construction of my capacitor as herein described. Various modifications of the same coming within the true spirit and scope of my invention are meant to be covered in the appended claims.

In an application, Serial No. 202,265, filed April 15, 1938 (constituting a continuation-in-part of the present application) claims have been made on capacitors similar to the capacitors covered by the claims hereof but containing ammonium borate in place of Rochelle salt.

What I claim as new and desire to secure by Letters Patent of the United States, is:

1. An electric capacitor comprising the combination of juxtaposed unoxidized aluminum armatures, a non-aqueous solution of Rochelle salt in ethylene glycol located in contact with said armatures, and at least one sheet of substantially non-porous paper located between said armatures and substantially insulating the same from one another, said paper having a density of at least about 0.95.

2. An electric capacitor comprising the combination of juxtaposed unoxidized film-forming armatures, a non-aqueous solution consisting of at least 5 per cent of Rochelle salts in a polyhydric alcohol in contact with said armatures, and a substantially non-porous dielectric septum separating said armatures, said septum having such low porosity that the capacity between said armatures varies inversely with the thickness of said septum.

3. An electric capacitor comprising the combination of unoxidized aluminum armatures, a kraft paper septum therebetween and a substantially non-aqueous solution of Rochelle salt in ethylene glycol wetting and adhering to said paper, said salt being present in the proportion of about 5 to 10 per cent by weight in said solution, said paper having sufficiently high dielectric property to cause the capacity between said armatures to vary inversely with the thickness of said septum and to permit said capacitor to operate without film-formation.

4. An electric capacitor comprising the combination of non-oxidized aluminum armatures assembled with interposed non-conducting sheet material in a compressed state, said sheet material consisting of one or more sheets of kraft paper having a density of at least about 0.95 and a solution of Rochelle salt in substantially water-free polyhydric alcohol filling voids between said armatures.

5. An electric capacitor comprising the combination of juxtaposed, unoxidized, film-forming capacitor armatures and a liquid non-aqueous material consisting of polyhydric alcohol and Rochelle salt located in contact with said armatures and one or more sheets of substantially non-porous dielectric material located between said armatures, the combination of said dielectric material and said liquid resulting in a capacity which is materially higher than the capacity of a wax or oil-treated capacitor and which varies inversely with the thickness of said dielectric material.

6. An electric capacitor comprising the combination of juxtaposed aluminum armatures, a solution containing at least 90 per cent of ethylene glycol and containing Rochelle salts located in contact with said armatures and a non-porous septum of substantially non-conducting sheet material located between said armatures, said material having a sufficiently high dielectric property to cause the capacity between said armatures to vary inversely with the thickness of said sheet material.

FRANK M. CLARK.